Aug. 25, 1970  R. H. VICKERS  3,525,583
PROCESS FOR PRODUCING THE COMPLEX, $(Na_3PO_4 \cdot 11H_2O)_4 \cdot NaClO$
Filed July 25, 1966  4 Sheets-Sheet 1

INVENTOR
RONALD HENRY VICKERS

BY Merriam, Marshall, Shapiro & Klose  ATTORNEYS

Aug. 25, 1970  R. H. VICKERS  3,525,583
PROCESS FOR PRODUCING THE COMPLEX, $(Na_3PO_4 \cdot 11H_2O)_4 \cdot NaClO$
Filed July 25, 1966  4 Sheets-Sheet 2
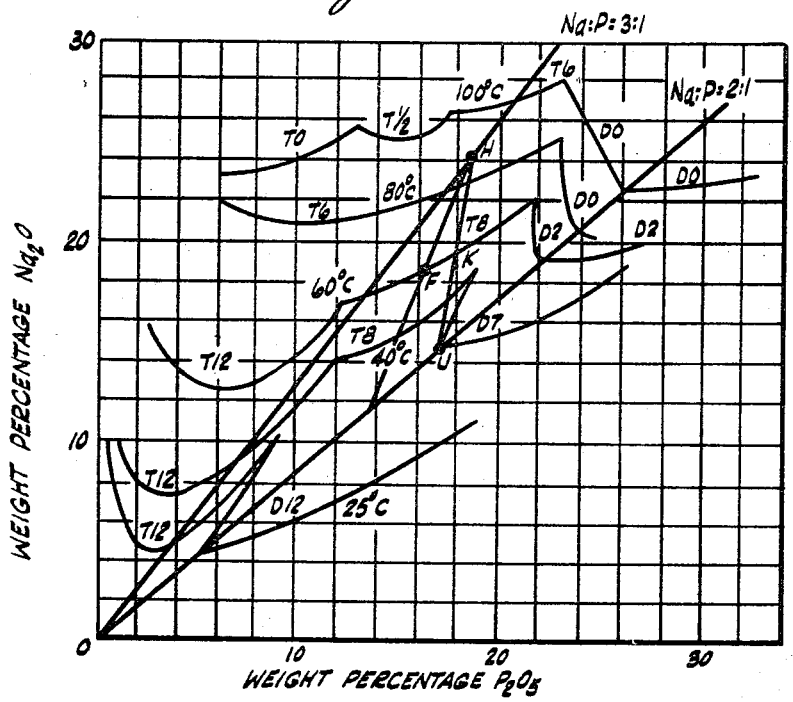
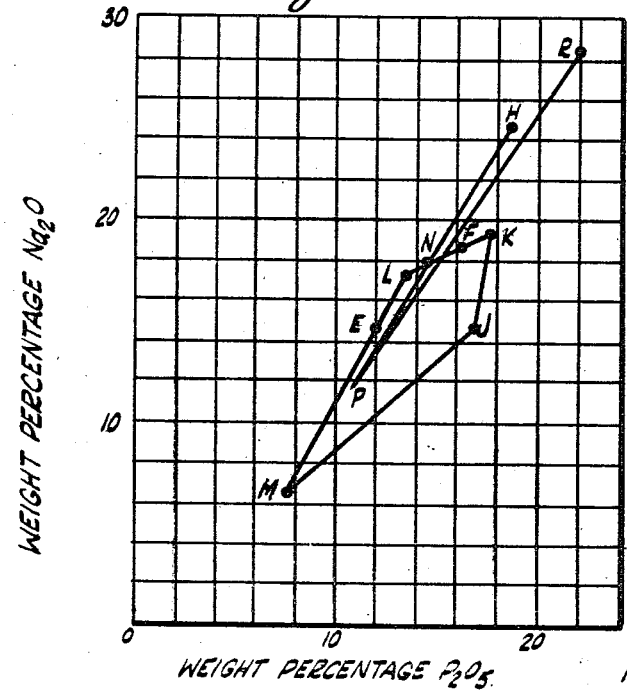
INVENTOR
RONALD HENRY VICKERS
BY Merriam, Marshall, Shapiro, & Klose ATTORNEYS

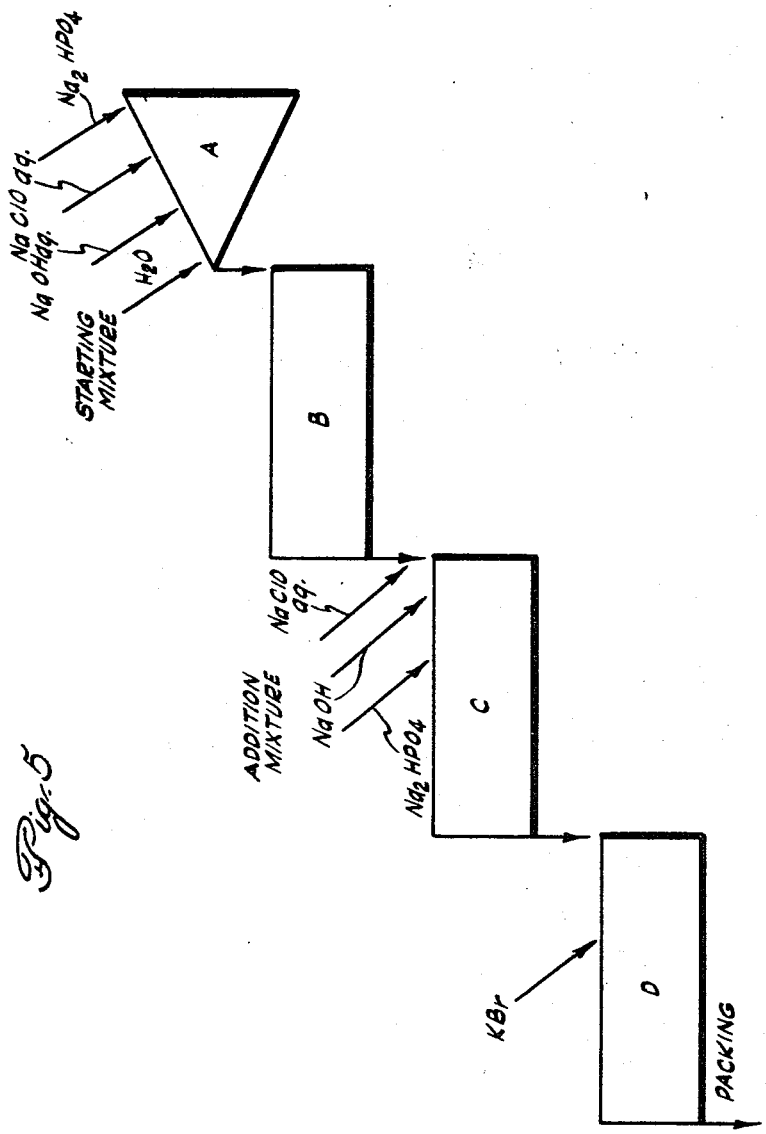

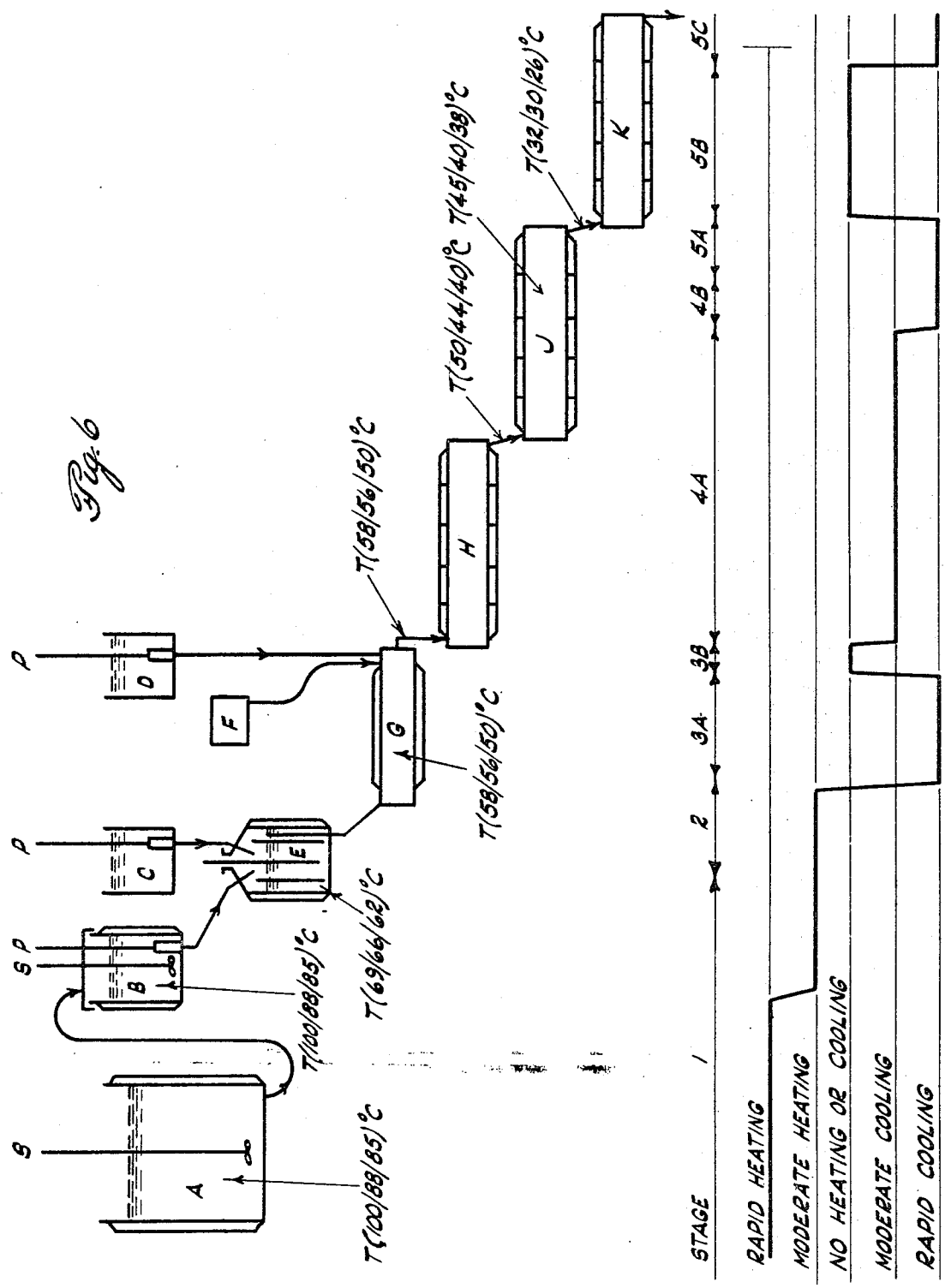

United States Patent Office 3,525,583
Patented Aug. 25, 1970

3,525,583
PROCESS FOR PRODUCING THE COMPLEX,
$(Na_3PO_4 11H_2O)_4 \cdot NaClO$
Ronald Henry Vickers, Wheathampstead, England, assignor to The Diversey Corporation, Chicago, Ill., a corporation of Illinois
Filed July 25, 1966, Ser. No. 567,765
Claims priority, application Great Britain, Sept. 1, 1965, 37,412/65
Int. Cl. C01d
U.S. Cl. 23—50    5 Claims

ABSTRACT OF THE DISCLOSURE

A chlorinated sodium phosphate composition comprising a sodium phosphate/sodium hypochlorite complex having the composition $$(Na_3PO_4 11H_2O)_4 NaClO$$

and essentially lacking in complexes of sodium phosphate combined with sodium hydroxide or sodium chloride. A hot mixture containing sodium phosphates and sodium hypochlorite is cooled while mixing and, when crystals have appeared but the temperature is still above 30° C., addition is made of a mixture containing less water than the original mixture and which contains sodium phosphates and/or sodium hypochlorite, and after cooling to 30° C., the temperature is maintained at 25° C.–30° C. before packaging the product.

---

This invention relates to stable solid compositions containing a hypochlorite and methods for the preparation of such compositions.

One of the most effective of the known bactericidal compositions of this type contains sodium phosphate in addition to sodium hypochlorite. A bromide also may be present to enhance the bactericidal effect. The present invention is concerned with improved methods of preparation for such compositions and the resulting improved compositions themselves.

Various methods have been proposed for making these phosphate-stabilized hypochlorites.

One method involves the preparation of a solution of sodium phosphate at a high concentration and the addition to this of sodium hypochlorite, either directly as a solution or by the successive addition of sodium hydroxide and gaseous chlorine. Cooling the resulting reaction mixture leads to partial crystallization of a material containing both phosphate and sodium hypochlorite. The crystals are separated from the mother liquor and dried, and the mother liquor may to some extent be reused in making further batches so as to recover as completely as possible the dissolved phosphates and hypochlorite.

Another method involves the preparation of a solution of sodium phosphate as before but at a much higher concentration and at high temperatures, such that when sodium hypochlorite is added and the whole is cooled a solid mass is obtained which is later ground to convenient size.

A third method involves, as before, the addition of sodium hypochlorite to a solution of sodium phosphate, but the cooling is carried out more slowly and with constant stirring of the mass. The resultant material is a damp crystalline solid which is subsequently dried by passage through a rotary kiln or by other means.

A fourth method involves mixing solid sodium phosphate, which may be partially or completely hydrated, in a suitable vessel, while passing into that vessel either a stream of gaseous chlorine or a solution of sodium hypochlorite. The mixture remains essentially solid throughout the process.

The chlorinated trisodium phosphate produced according to the method disclosed in U.S. Pat. No. 1,965,304 is obtained as a slightly damp crystalline mass which does not flow easily. It can be converted to a dry, crystalline, free flowing material by a separate drying stage, but this is an extra step which it should be desirable to avoid. Attempts have been made to produce directly a dry material at the end of the crystallization step by increasing the concentration of the initial sodium phosphate solution, so as to have less residual water available after the crystallization to cause the product to have a damp appearance. These attempts were unsuccessful in that although a dry product was produced, it had reduced hypochlorite stability.

All of the previous methods suffer to some extent from disadvantages, either of economics or in the properties of the resultant product. Thus, the sodium hypochlorite in the composition may be of low stability leading to short shelf life, or the distribution of particle sizes in the final product may be less than ideal, leading to dustiness, or there may be slow solubility of the product in use.

It is an object of the present invention to provide an economic process which, if preferred, may be run continuously rather than batch wise, and which leads to a product of satisfactory crystalline form and of good chlorine stability and rapid solubility. It is a further object to provide a solid, hypochlorite-containing composition which consists in large part of a complex crystalline species of sodium hypochlorite and sodium phosphate, of the composition $(Na_3PO_4 \cdot 11H_2O)_4 \cdot NaClO$. The invention consists, broadly, in making a solid, sodium hypochlorite/sodium phosphate-containing composition from an aqueous alkaline sodium hypochlorite, sodium phosphate-containing mixture, in which the composition of the mixture is controlled to substantially prevent the deposition, as part of said composition, of a complex of sodium phosphate with sodium hydroxide or sodium chloride, or the deposition of simple sodium phosphate hydrates.

The invention also consists in a process of crystallizing a solid, sodium hypochlorite/sodium phosphate-containing composition from an aqueous alkaline sodium hypochlorite, sodium phosphate-containing starting mixture within the area bounded by the lines JK, KL, LM and MJ of FIG. 4 hereinafter described.

According to a further feature of the invention, during the course of the crystallization, material of lesser water content than the starting material is incorporated in the mixture while keeping the composition of the aqueous phase within the aforesaid bounded area (so far as concerns the recited ingredients) and/or such as to substantially prevent the deposition of a sodium phosphate complex containing a component other than sodium hypochlorite or a simple sodium phosphate hydrate. In this way there is obtained a dry product without any separate drying step.

Crystals of sodium phosphate/sodium hydroxide complex (this term being understood to include crystalline species containing trisodium phosphate, sodium hydroxide and water only) are formed by crystallization from solutions of sodium phosphate in which the molecular ratio of $Na_2O$ to $P_2O_5$ is approximately 3.0, corresponding to $Na_3PO_4$. However, they are also formed by crystallization from solutions of sodium phosphate in which this molecular ratio is not exactly 3.0 but is slightly above or slightly below that value. The crystals themselves have a ratio slightly above 3.0, so that if a solution originally has this ratio at the level of 3.0 and sodium phosphate/sodium hydroxide complex crystallizes, then the solution remaining must have a ratio less than 3.0. The lower the ratio in the remaining solution the less the chance of further sodium phosphate/sodium hydroxide complex being able to crystallize. At some minimum level of this ratio the sodium phosphate/sodium hydroxide complex will no longer crystallize, and the knowledge of this level of the ratio is useful in avoiding the formation of sodium phosphate/sodium hydroxide complex when the intention is to cause formation of the sodium phosphate/sodium hypochlorite complex.

The following are the supposed compositions of some of the complexes which, by crystallizing out, can "waste" sodium phosphate:

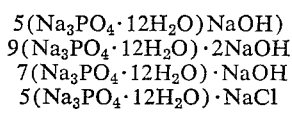

In any reaction mixture from which it is intended to crystallize the sodium hypochlorite/sodium phosphate complex there may be other materials present which may permit one of these other complexes to crystallize. Should this occur, sodium phosphate may be consumed in forming the alternative complex and as a result there may be insufficient sodium phosphate remaining to crystallize with the sodium hypochlorite as the desired complex. This is undesirable because the sodium hypochlorite complex is appreciably more stable than the sodium hypochlorite present as a simple crystalline species. The conditions of the process must, therefore, be such as to avoid preferential crystallization of the alternative undesirable crystalline complexes. Of particular importance in this connection are the undesirable crystalline complexes of sodium hydroxide and sodium phosphate.

The invention will be considered further in conjunction with the drawings in which:

FIGS. 1 to 3 are solubility curves at different temperatures in the $Na_2O$—$H_2O$—$P_2O_5$ orthophosphate system with boundary lines drawn thereon as developed to define the operable mixtures in performing the invention;

FIG. 4 is a chart, using the same coordinates as FIGS. 1 to 3, which defines by a bounded area the composition of mixtures, without the hypochlorite content, useful in the invention;

FIG. 5 is a flow sheet illustrating the process of this invention; and

FIG. 6 is a further flow sheet showing a pilot plant continuous operation.

Figure 1:
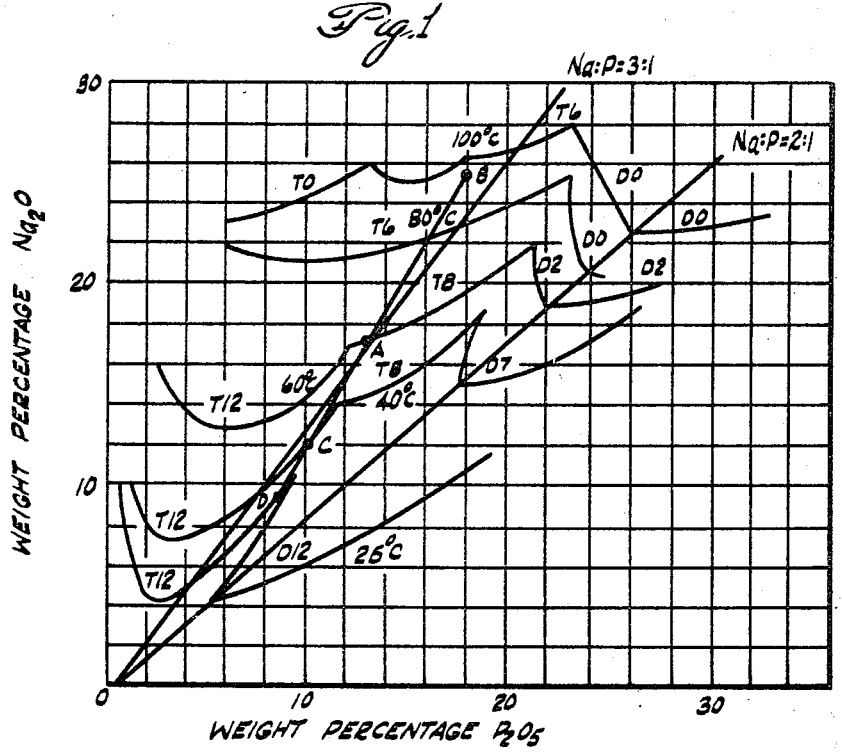

FIG. 1 is a series of solubility curves for various hydrates of sodium phosphate. It is adapted from the chart in Phosphorus and Its Compounds by Van Wazer, Vol. I, page 494, Interscience Publishers, 1958. On each curve a temperature is indicated in degrees centigrade, and letters with numerical subscripts indicate the various crystalline species involved. These are:

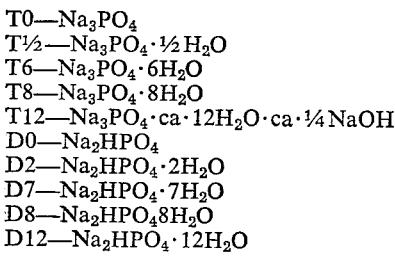

Consider a composition represented by the point A on FIG. 1. Point A represents a material of composition $Na_2O$ 16.8%, $P_2O_5$ 12.8%, water 70.4%. Those familiar with the art will appreciate that at 40° C. such a composition will be composed of two phases, a solid phase of composition T12 approximately $Na_3PO_4 \cdot 12H_2O \cdot \frac{1}{4} NaOH$ corresponding to point B on FIG. 1, and a liquid phase of composition given by point C on FIG. 1. Point B has composition $Na_2O$ 25.85%, $P_2O_5$ 18.2%, water 55.95%. It is the same as T12. Point C has composition $Na_2O$ 12.0%, $P_2O_5$ 9.9%, water 78.1%. Similarly it will be recognized that at 25° C. composition A will again be composed of two phases, one the solid phase represented by point B as before and the other a liquid phase of composition represented by point D on FIG. 1. Composition A is, therefore, a composition which on cooling can give rise to the formation of the solid composition represented by point B, which is the undesirable T12 sodium phosphate/sodium hydroxide complex described above. Composition A is, therefore, an unsatisfactory composition.

Figure 2:
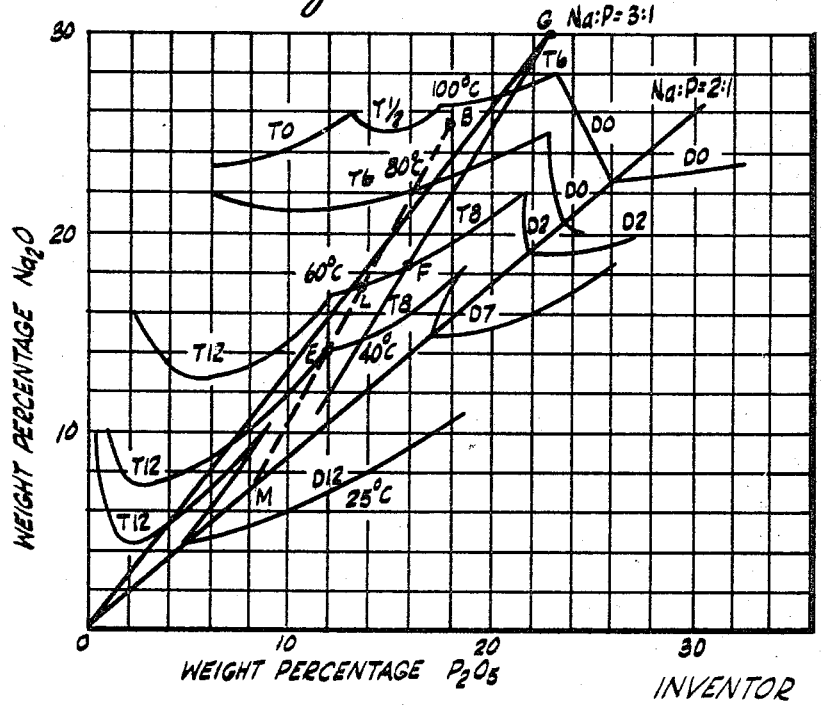

To illustrate the limits of compositions which are undesirable in this respect the same solubility curves are repeated in FIG. 2 of the accompanying drawings. In FIG. 2 composition B is also indicated. A dotted line is drawn from point B through point E, which is at the junction of the 40° C. solubility curves for T12 and T8. Compositions represented by points to the left of the line BE on cooling deposit solid of composition T12 represented by the point B, being a sodium phosphate/sodium hydroxide complex, whereas compositions represented by points to the right of the line BE can never deposit solid T12 sodium phosphate/sodium hydroxide complexes. Compositions to the left of line BE are therefore outside the scope of this invention. Although the dotted line could have been drawn from B to the intersection of the T12/T8 curve at 60° C. or 25° C., the point E at the intersection of the T12/T8 curve at 40° C. was used to assure having all the T12/B undesirable areas to the left of the line. The point L is at the intersection of the dotted line and the T8 curve at 60° C. Also the point M is at the intersection of the dotted line and the Na:P=2:1 line.

Consider now a composition represented by the point F, on the 60° C. solubility curve for T8. At temperatures above 60° C. this composition will be liquid, whereas at temperatures below 60° C., solid will separate having the undesirable composition T8, i.e. $Na_3PO_4 \cdot 8H_2O$, represented by point G, indicating a composition $Na_2O$ 30.2%, $P_2O_5$ 23.0%, water 46.8%. When T8 has begun to crystallize the composition of the residual fluid phase will be represented by some point on the line GF, below F. Suppose now some of the water in composition F is replaced by sodium hypochlorite which, if added as sodium hypochlorite solution, will necessarily be accompanied by some sodium chloride.

For clarity the curves in FIG. 2 are repeated in FIG. 3. Consider the composition F containing sodium hypochlorite. It has been found that from such compositions the sodium phosphate/sodium hypochlorite complex, i.e. $(Na_3PO_4 \cdot 11H_2O)_4 \cdot NaClO$, begins to crystallize at above 62° C.

The desirable sodium phosphate/sodium hypochlorite complex, $(Na_3PO_4 \cdot 11H_2O)_4 \cdot NaClO$, is shown in FIG. 3 by point H, at $Na_2O$=24.45%, $P_2O_5$=18.65%, NaClO= 4.9%, $H_2O$=52.0%. As this composition crystallizes at 62° C., the composition of the residual fluid phase progresses along the line HF below F. When the temperature has fallen to 60° C., we would no longer expect material of composition T8 to start to crystallize because the composition of the fluid phase would not have a composition favorable to crystallization of T8. The crystallization of the composition at point H creates an imbalance against T8 crystallizing. Similarly, when the temperature has fallen to 40° C., we still would not expect T8 to crystallize because by then the composition of the residual fluid phase would have passed along the line HF beyond the 40° C. solubility curve for T8. The 60° C. solubility curve for T8 in an $Na_2O/P_2O_5/$ water system thus represents a boundary line separating initial compositions which lie above the line and are outside the scope of our invention from those which are below the line and may be within the scope of our invention.

Another such boundary line is provided by the line drawn from the ponit H to the intersection of the most extreme point of the 40° C. solubility curve for D7 and the Na:P=2:1 line, shown in FIG. 3 as the line HJ. The point K is at the intersection of the HJ line with the T8 curve at 60° C. The line HJ is positioned to exclude formation of disodium salt crystals. The further to the left J is located, the lower the temperature to which this exclusion would apply. Thus, if J was at the intersection of the 60° C. D2 curve and the Na:P=2:1 line, the disodium salt crystallization would have been excluded only to temperatures down to 60° C. Protection only down to 60° C. was considered insufficient. With positioning of J at the intersection of the 25° C. D12 curve and the Na:P=2:1 line, disodium salt crystallization would be excluded down to 25° C. To provide protection down to 25° C. would narrow the boundary area of acceptable starting compositions too much. Protection down to 40° C. thus represents a practical choice.

Compositions of sodium phosphates in which the sodium to phosphorus atomic ratio is 2:1 have a pH around 9 depending on concentrations. Concentrated sodium hypochlorite solutions are unstable at pH levels below about 9. Compositions containing sodium hypochlorite and sodium phosphate in which the sodium to phosphorus atomic ratio (ignoring any sodium associated with the hypochlorite) is above 2 to 1, are likely to be stable with respect to the hypochlorite present, whereas corresponding compositions in which the sodium to phosphorus atomic ratio is less than 2 to 1 are likely to be unstable. The line on FIG. 3 shown as Na:P=2:1 and on FIG. 4 as the line M to J thus represents another boundary line.

In FIG. 4 of the accompanying drawings the boundary lines described above are shown to indicate the area or range of starting compositions which can be used according to the invention. These starting compositions are thus within the range bounded by the four compositions, $Na_2O=17.4$, $P_2O_5=13.4$ (point L); $Na_2O=6.6$, $P_2O_5=7.6$ (point M); $Na_2O=14.8$, $P_2O_5=16.8$ (point J); $Na_2O=19.6$, $P_2O_5=17.7$ (point K) in the graph of FIG. 4 which plots percent $Na_2O$ against percent $P_2O_5$ for compositions containing sodium phosphate, sodium hypochlorite, water and other materials.

Also shown in FIG. 4 is the point H corresponding to a representative sodium phosphate/sodium hypochlorite complex which it is intended to produce. It is unsuitable to mix components to give overall the composition H, containing hypochlorite, heat this mixture until all solids are dissolved and then cool until crystallization occurs. Such a composition on cooling would give some different crystalline species than the desired one.

We have discovered that when a composition within the bounded area JKLM in FIG. 4 is heated until all solids have dissolved and is then cooled, crystals of the desired $(Na_3PO_4 \cdot 11H_2O)_4 \cdot NaClO$ composition appear at a temperature above 62° C., and that as crystalilzation proceeds the mass becomes more and more solid. When the mass reaches room temperature, it is more or less damp, depending on the actual composition within the bounded area.

Additions can be made during the crystallization to overcome any dampness in the final product without recourse to a separate drying step. To explain our method in this respect consider the composition N within the bounded area of FIG. 4. This composition, containing $Na_2O=17.9\%$, $P_2O_5=14.5\%$ may be made by mixing (anhydrous) disodium hydrogen phosphate, 28.95%; sodium hydroxide 50% solution 13.35%; water 31.2%; and sodium hypochlorite solution 26.5%. When hot this composition is liquid and on cooling crystals separate of the sodium phosphate/sodium hypochlorite complex H. The composition of the residual fluid phase thus progresses along the line HN, say to some point P.

The point R represents a composition $Na_2O=28.74\%$; $P_2O_5=21.9\%$ provided by a mixture of anhydrous trisodium phosphate 50.5% and sodium hypochlorite solution 49.5%. In this case the composition R has the same ratio of $Na_2O$, $P_2O_5$ and hypochlorite as the desired sodium phosphate/sodium hypochlorite complex, H, but contains a lesser proportion of water. Other examples of R, where N is a different position within the quadilateral JKLM of FIG. 4, might contain a completely different ratio. Here, R can be added to the partially crystallized mass N, gradually, and while the latter is still at 45° to 60° C. The addition moves the composition of the residual fluid phase along the line PR, while still retaining the composition of the fluid phase within the bounded area and hence within the range for preferential crystallization of the desired sodium phosphate/ sodium hypochlorite complex. Thus, as R is progressively added, progressively more desirable sodium phosphate/sodium hypochlorite complex crystallizes and the proportion of residual fluid phase to the total mass falls. Finally, when the required quantity of R has been added the process is completed by allowing the mass to cool further. When the temperature has fallen to 30° C., it is found advantageous to maintain the mass at 27°–30° C., for a period of up to one hour with mild agitation before finally cooling to room temperature and packing in containers.

The composition R is not restrictive and is only one additive composition chosen for illustration. The invention also includes the addition of other compositions to a partially crystallized mass of material provided the added composition is such as to retain the composition of the fluid phase within the required range to lead to preferential crystallization of sodium phosphate/sodium hypochlorite complex. Thus, the composition added to the partially crystallized mass may be a sodium phosphate with or without sodium hypochlorite, or it may be a mixture of these materials with some other material which will achieve the purpose or it may be some other material without sodium phosphate present.

When compositions such as R are used to provide the addition during crystallizing, the final overall composition will contain a higher proportion of the desired hypochlorite complex than when chlorinated trisodium phosphate is made by other earlier methods. Thus, the available chlorine in stable compositions of this type can approach the theoretical maximum of 4.9% available chlorine, whereas conventional chlorinated trisodium phosphates have available chlorine levels between 3.0 and 4.0%.

It is advantageous in such compositions to include sodium tripolyphosphate, and this will also serve the purpose of maintaining the composition of the fluid phase within the bounded area by abstracting some of the water in forming a sodium tripolyphosphate hydrate. Similarly, sodium silicate may be advantageous in reducing metal corrosion by the final composition and will likewise serve to maintain the composition of the fluid phase within the desired limits. Also, an alkali metal carbonate such as sodium carbonate can be added.

Surface active agents are valuable components of detergent systems and may advantageously be incorporated in the composition prepared according to the invention.

Permanganates and other dyes such as sodium chromate form complex crystals with trisodium phosphate. The permanganate complex crystals are highly colored and a trace proportion of permanganate colors the whole mass of crystals a pink/purple color. Thus, permanganates are desirable components of the mixture.

Inorganic and organic bromides which provide free bromine in solution have considerable value in enhancing the bactericidal action of sodium hypochlorite and thus can be advantageously included in the composition.

Compositions produced by the process of the invention may be used as detergents, disinfectants, bactericides or destaining agents and in dishwashing compositions.

The process of the invention lends itself either to batch wise or to continuous operation.

In the batch wise preparation, sodium phosphate solution is prepared conveniently from sodium hydroxide and phosphoric acid, or one of the sodium acid phosphates and sodium hydroxide, or trisodium phosphate and an acid sodium phosphate, or trisodium phosphate and phosphoric acid or any combination of these, together with water. The sodium phosphate solution is maintained at an elevated temperature of 60° C.–105° C., preferably 85° C.–105° C. To this sodium phosphate solution is added sodium hypochlorite solution containing 10%–20%, preferably 14%–20% sodium hypochlorite, and the whole is well mixed while maintaining the temperature above 60° C., advisably above 65° C. This mixture represents a starting mixture composition within the bounds JKLM shown in FIG. 4. This starting mixture is agitated continuously while it is allowed to cool, or is cooled by passage of coolant through a jacket on the containing vessel or is cooled by some other forcible means. During the cooling process, crystals separate and the mass becomes a slurry of these crystals in residual fluid. When this stage has been reached and when the temperature has fallen to 30° C.–60° C., preferably 45° C.–60° C., a gradual addition is made of an addition mixture. The addition mixture contains a lower proportion of water than the starting mixture and may contain sodium phosphate and sodium hydrochlorite preferably with the sodium to phosphorus to hypochlorite ratio approximately as is present in the desired sodium phosphate/sodium hypochlorite complex. Part or all of the sodium phosphate and sodium hypochlorite may be replaced by sodium tripolyphosphate, sodium pyrophosphate or a mixture of these or other polyphosphates or sodium silicate or a mixture of sodium silicate and sodium phosphate. The addition mixture may also advantageously contain a surface active agent, such as sodium alkyl aryl sulphonate including sodium alkyl naphthalene sulphonate, or sodium alkyl ether sulphate, or sodium alkyl sulphate. Other surface active agents which may advantageously be used are the hypochlorite stable nonionic agents or cationic agents such as the quaternary ammonium compounds, for example, alkyl dimethyl benzyl ammonium chloride or alkyl trimethyl ammonium chloride. Surface active agents are known to modify crystal habit and may thus be used to assist in the formation of a more physically acceptable product.

The addition mixture may also contain permanganate salts such that by formation of the colored sodium phosphate/sodium hypochlorite/permanganate complex the whole mass may be colored a pleasing and stable pink or purple.

The addition mixture, which may or may not be premixed in some separate vessel, is added to the partially crystallized starting mixture at such a rate and with such external temperature control as is necessary to maintain the overall temperature in the range of 30° C.–60° C., preferably 45° C.–60° C. When all of the addition mixture has been added to the main batch the temperature is allowed progressively to fall until at about 30° C. the product is essentialy a solid crystalline mass, which is free flowing and is not damp. At this point it is advantageous to allow the temperature to remain stable for up to one hour at 27° C.–30° C., while continuing to agitate the mass, and during this period addition may advantageously be made of a soluble alkali metal bromide such as potassium bromide, although this addition is not essential. Finally, the mass is packed into containers with or without pre-cooling to ambient temperature.

EXAMPLE 1

An example of the continuous method of the invention is illustrated diagrammatically in FIG. 5 of the accompanying drawings. In FIG. 5, A, B, C, D represent suitable mixing vessels to which the contents are gradually added from right to left. In A the starting mixture is prepared and maintained at a correct composition by carefully controlling the flow rates of the ingredients. The starting mixture passes continuously to B in which while it is progressing along the length of B it is cooled and is partially crystallized. As it passes out of B into C it meets a stream of the addition mixture either prepared or, as shown in FIG. 5, added separately. The mass is further cooled in C to about 30° C. before it passes to D. In D, the crystals are maintained for part of the passage at a temperature of 27° C.–30° C. and during this period potassium bromide is added. Finally, the crystals are cooled to 25° C. before packing. Cooling is effected in the various mixing vessels by a series of zoned cooling jackets. Thus, any of the vessels may have up to five separate cooling jackets serving different parts of the vessel, and be separately controllable.

FIG. 6 gives a pictorial representation of the layout used in a pilot plant production of the trisodium phosphate/sodium hypochlorite complex of the formula $(Na_3PO_411H_2O)_4)NaClO$. Potassium permanganate was incorporated to act as a dye for the final product. The lower part of the figure indicates the degree of heating or cooling operative at each stage.

The numbered stages in FIG. 6 refer to the following operations:

(1) Preparation of the $Na_2HPO_4/Na_3PO_4$ liquor.
(2) First addition of sodium hypochlorite solution.
(3A) Cooling and crystallization of

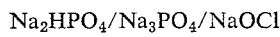
$$Na_2HPO_4/Na_3PO_4/NaOCl$$

ready for further additions.
(3B) Addition of trisodium phosphate (solid) and the second solution of sodium hypochlorite. This second solution of sodium hypochlorite also contained 0.08% w./w. potassium permanganate.
(4A) Crystallization of main trisodium phosphate/sodium hypochlorite complex.
(4B) Cooling towards transition temperature.
(5A) Completion of cooling to transition temperature.
(5B) Transition crystallization and aging of complex.
(5C) Cooling below transition temperature.

The vessels of the pilot plant lay-out of FIG. 6 are identified as follows:

| Letter: | Vessel type |
|---|---|
| A | Di-tri batch preparation tank. |
| B | Di-tri pump tank. |
| C | First hypochlorite pump tank. |
| D | Second hypochlorite-$KMnO_4$ pump tank. |
| E | Di-tri/hypochlorite mixing tank. |
| F | Trisodium phosphate weigh feeder. |
| G | Primary mixer. |
| H | First Universal mixer. |
| J | Second Universal mixer. |
| K | Simplex mixer. |

Also the letter S signifies a stirrer and P a pump. In addition, for each vessel there is given the theoretical maximum, optimum and minimum temperatures in ° C. for the solution in each vessel or as fed therefrom. Thus, for vessel E, 69° C. is the maximum, 66° C. the optimum and 62° C. the minimum temperature for the solution in that vessel.

The most suitable composition of the starting

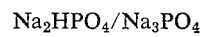
$$Na_2HPO_4/Na_3PO_4$$

liquor (di-tri liquor) was as follows:

| Di-tri liquor: | Percent w./w. |
|---|---|
| $Na_2HPO_4$ | 35.2 |
| Caustic soda liquor, 100° Tw. | 8.0 |
| Water | 56.8 |
| | 100.0 |

The total composition of the trisodium phosphate/sodium hypochlorite complex is as follows:

Total composition: Percent w./w.
- Di-tri liquor _____ 31.94
- First sodium hypochlorite solution (11.5% w./w. available chlorine) _____ 8.06
- $Na_3PO_4$ _____ 30.35
- Second sodium hypochlorite solution (containing 11.5% w./w. available chlorine and 0.08 w./w. $KMnO_4$) _____ 29.65

100.0

The feed rates necessary to produce a throughput of 100 lbs. per hour of a product of the above total composition are:

Di-tri liquor—8.50 oz./minute
First hypochlorite solution—48.70 mls./minute
$Na_3PO_4$ feed—8.12 oz./minute
Second hypochlorite solution—179.50 mls./minute Satisfactory product was obtained when the temperatures were as follows:

|  | °C. |
|---|---|
| Di-tri liquor pumping tank (vessel B) | 96.5 |
| Exit from the reaction vessel (vessel E) | 64.0 |
| Exit from the Primary mixer (G) | 53.0 |
| Exit from Universal mixer (J) | 26.0 |
| Exit from the Simplex mixer (K) | 18.0 |
| Ambient temperature | 14–15 |

These temperatures were recorded when the relative humidity in the building was 65%.

EXAMPLE 2

Production of the desired $(Na_3PO_4 11H_2O)_4NaClO$ complex by a batch process

Seven hundred and twenty (720) kilograms of a solution of disodium phosphate and trisodium phosphate with an empirical formula $Na_{2.73}H_{0.27}PO_4$ and a specific gravity of 1.54 at 100° C. was placed in a horizontal mixer and agitation started. When the temperature had fallen to 90° C., 289 kg. of sodium hypochlorite solution containing 15.3% w./w. available chlorine was added to the mixer over a period of 8 minutes. Cooling water was applied to the jacket of the mixer. When the temperature had fallen to approximately 60° C., 59 kg. of anhydrous trisodium phosphate was added slowly while maintaining agitation. At this point the mass in the mixer was a thick paste adhering strongly to the blades of the mixer. In the next 25 minutes it became progressively drier and at the end of this period was falling off the mixer blades in large lumps. During the next 25 minutes these lumps broke up under agitation until the whole mass became a slightly damp powder. At this time with a temperature of approximately 42° C., a further addition of 50 kg. of anhydrous trisodium phosphate was made and mixing continued further for 20 minutes. The whole mass was then a dry crystalline powder which was readily sievable.

EXAMPLE 3

Production of the desired complex containing the sodium salt of an alkyl aryl sulphonate (i.e. an anionic surface active agent)

To 794 mls. of water at a temperature of 36° C. in a stainless steel mixing bowl was added 230 mls. of 50% w./w. sodium hydroxide solution at the same temperature. 740 gms. of anhydrous $Na_2HPO_4$ was then added to this solution, with mixing, thus producing a solution in which the ratio Na:P=3:1. To this solution 540 mls of 15.2% w./w. sodium hypochlorite solution was added. The heat of reaction of these ingredients raised the temperature to 67° C. The solution was allowed to cool to 55° C., during which time mixing was contiued. At this temperature the water abstracting additive consisting of 949 gms. of anhydrous trisodium orthophosphate, was added. 735 mls. of 15.2% w./w. sodium hypochlorite solution was then added slowly and this was immediately followed by the addition of 113.5 gms. of sodium dodecyl benzene sulphonate. The whole mixture was continuously stirred and slowly cooled to 30° C. This procedure produced a product which had a stable available chlorine and a surface active agent content of 2.50% w./w.

EXAMPLE 4

Production of the desired complex containing an amine polyglycol condensate 230 mls. of 50% sodium hydroxide solution was added to 816 mls. of water at 36° C. in a stainless steel mixing bowl. 750 gms. of anhydrous $Na_2HPO_4$ was then continuously mixed in. To this mixture 553 mls. of 15.2% w./w. sodium hypochlorite solution was added. The temperature at this point was 67° C. Stirring was continued and the whole allowed to cool at 55° C. At this temperature 979 gms. of anhydrous trisodium orthophosphate and 755 mls. of 15.2% w./w. sodium hypochlorite solution were added slowly. On completion of this addition 11.35 gms. of a nonionic amine polyglycol condensate (trade name: Triton CF–32 from Rohm & Haas) was immediately added and stirred in. The whole mixture was then stirred with cooling until the temperature had fallen to 30° C. This procedure produced the trisodium phosphate/sodium hypochlorite complex containing 0.25% w./w. amine polyglycol condensate, a nonionic surface active agent.

EXAMPLE 5

Production of desired complex containing the sodium salt of a dodecyl diphenyl-ether disulphonate 235 mls. of 50% sodium hydroxide solution was added to 816 mls. of water at 36° C. in a stainless steel mixing bowl. 756 gms. of anhydrous $Na_2HPO_4$ was then added with continuous mixing. To this was added 553 mls. of 15.2% sodium hypochlorite solution. At this point the temperature was 67° C. The whole was then allowed to cool, with continuous mixing, to 55° C. At this temperature 970 gms. of anhydrous $Na_3PO_4$ and 755 mls. of 15.2% w./w. sodium hypochlorite solution was slowly added. This was immediately followed by the addition of 11.35 gms. of the sodium salt of dodecyl diphenyl-ether disulphonate (trade name: Dowfax 2A1, Dow Chemical Co.). The whole was stirred and cooled to 30° C. This procedure produced trisodium phosphate/sodium hypochlorite complex containing 0.25% w./w. of a dodecyl diphenyl-ether disulphonate, an anionic surface active agent.

EXAMPLE 6

Production of the desired complex containing the sodium salt of dodecyl naphthalene sulphonate 235 mls. of 50% sodium hydroxide was mixed with 816 mls. of water at 36° C. in a stainless steel mixing bowl. While continuously mixing, 756 gms. of anhydrous $Na_2HPO_4$ was added. 553 mls. of 15.2% sodium hypochlorite was then added, bringing the final temperature up to 67° C. The whole was allowed to cool to 55° C. while mixing was continued.

At 55° C., 970 gms. of anhydrous $Na_3PO_4$ and 775 mls. of 15.2% sodium hypochlorite solution was slowly added. On completion of this addition, immediate further addition of 11.35 gms. of sodium dodecyl naphthalene sulphonate was made. The whole was stirred further and cooled to 30° C. This procedure produced the trisodium phosphate/sodium hypochlorite complex containing 0.25% w./w. dodecyl naphthalene sulphonate, an anionic surface active agent.

EXAMPLE 7

Production of the desired complex containing a quaternary ammonium compound-myristyl trimethyl ammonium bromide 235 mls. of 50% sodium hydroxide solution was mixed with 816 mls. of water at 36° C. in a stainless steel mixing vessel. 756 gms. of anhydrous $Na_2HPO_4$ were then continuously mixed in. 553 mls. of 15.2% sodium hypochlorite solution was then added. This brought the final temperature up to 67° C. Mixing of the whole was then continued allowing it to cool until a temperature of 55° C. was reached. At this temperature 970 gms. of anhydrous $Na_3PO_4$ and 755 mls. of 15.2% sodium hypochlorite solution were slowly added. 11.35 gms. of myristyl trimethyl ammonium bromide was then added immediately. Stirring of the whole mass and cooling were continued until the temperature reached 30° C. This procedure produced the trisodium phosphate/sodium hypochlorite complex containing 0.25% w./w. myristyl trimethyl ammonium bromide, a quaternary ammonium compound.

EXAMPLE 8

Production of the desired complex containing sodium tripolyphosphate 233 mls. of 50% sodium hydroxide solution was mixed into 758 mls. of water at 36° C. in a stainless steel mixing vessel. 703 gms. of anhydrous $Na_2HPO_4$ was then added with continuous mixing, followed by 526 mls. of 15.2% sodium hypochlorite solution. Mixing was continued and the whole allowed to cool to a temperature of 55° C. At 55° C. 2,107 gms. of granular sodium tripolyphosphate was added. The mixture was cooled and stirred until its temperature was 30° C. This procedure produced the trisodium phosphate/sodium hypochlorite complex containing 46.46% sodium tripolyphosphate.

EXAMPLE 9

Production of the desired complex containing sodium metasilicate 228 mls. of 50% sodium hydroxide was mixed into 788 mls. of water at 36° C. in a stainless steel mixing vessel. To this was added, with continuous stirring, 731 gms. of anhydrous $Na_2HPO_4$. This was followed by addition of 547 mls. of 15.2% sodium hypochlorite solution. The final temperature produced by this mixture was 67° C. The whole was allowed to cool down to 55° C. while stirring was being continued. At 55° C., 485 gms. of anhydrous $Na_3PO_4$, 387 mls. of 15.2% sodium hypochlorite solution and 1.052 gms. of anhydrous sodium metasilicate were slowly added. The whole mass was stirred and allowed to cool to 30 C. This procedure produced the trisodium phosphate/sodium hypochlorite complex containing 23% w./w. sodium metasilicate.

EXAMPLE 10

Production of the desired complex containing sodium pyrophosphate 235 mls. of 50% sodium hydroxide solution was added to 816 mls. of water at 36° C. in a stainless steel mixing vessel. 756 gms. of anhydrous $Na_2HPO_4$ was continuously mixed into this solution. 553 mls. of 15.2% sodium hypochlorite solution was then added. The mass was continuously mixed, and the temperature allowed to drop from 67° C. to 55° C. At 55° C., 485 gms. of anhydrous $Na_3PO_4$, 378 mls. of 15.2% sodium hypochlorite solution and 976 gms. of anhydrous sodium pyrophosphate were added. The whole mass was stirred and further cooled to 30° C. This procedure produced the trisodium phosphate/sodium hypochlorite complex containing 21.55% w./w. sodium pyrophosphate.

EXAMPLE 11

Production of the desired complex containing an alkali metal bromide 230 mls. of 50% sodium hydroxide solution was added to 794 mls. of water at 36° C. in a stainless steel mixing vessel. 740 gms. of anhydrous $Na_2HPO_4$ was then added, followed by 540 mls. of 15.2% sodium hypochlorite solution. The final temperature was 67° C. Mixing was continued until the temperature had fallen to 55° C. At 55° C., 949 gms. of anhydrous $Na_3PO_4$ and 735 mls. of 15.2% sodium hypochlorite solution were added slowly. The mass was continuously mixed and cooled to 30° C. At this temperature 113.5 gms. of potassium bromide was added and the mixing continued for a further 5 minutes. This procedure produced the trisodium phosphate/sodium hypochlorite complex containing 2.50% w./w. potassium bromide.

EXAMPLE 12

Production of the desired complex containing sodium carbonate 223 mls. of 50% sodium hydroxide solution was added to 734 mls. of water at 36° C. in a stainless steel mixing vessel. 680 gms. of anhydrous $Na_2HPO_4$ and 498 mls. of 15.2% sodium hypochlorite solution were then continuously mixed in. The final temperature produced was 67° C. Mixing was continued while allowing the mass to cool to 55° C. At 55° C., 873 gms. of anhydrous $Na_3PO_4$ and 679 mls. of 15.2% sodium hypochlorite solution were slowly added. This addition was immediately followed by a further addition of 66 mls. of water and 387 gms. of anhydrous sodium carbonate. The whole mass was then stirred and cooled to 30° C. This procedure produced the trisodium phosphate/sodium hypochlorite complex containing 10% w./w. sodium carbonate monohydrate.

EXAMPLE 13

Production of the desired complex containing another suitable dye (sodium chromate)

235 mls. of 50% sodium hydroxide solution was added to 816 mls. of water at 36° C. in a stainless steel mixing vessel. 756 gms. of anhydrous $Na_2HPO_4$ and 553 mls. of 15.2% sodium hypochlorite solution were then mixed in. The final temperature was 68° C. Mixing was continued and the whole allowed to cool to 55° C. At 55° C., 970 gms. of anhydrous $Na_3PO_4$ and 755 mls. of 15.2% sodium hypochlorite solution were slowly mixed in. On completion of this addition an immediate addition of 45 gms. of sodium chromate dissolved in 100 mls. of water was made. The whole mass was then stirred and cooled to 30° C. This procedure produced the trisodium phosphate/sodium hypochlorite complex containing 0.1% w./w. of a suitable dye (sodium chromate).

EXAMPLE 14

Production of the desired complex containing a mixture of alkali metal tripolyphosphate, alkali metal silicate and sodium dodecyl benzene sulphonate, an anionic surface active agent 235 mls. of 50% sodium hydroxide solution was added to 816 mls. of water at 36° C. in a stainless steel mixing vessel. 756 gms. of anhydrous $Na_2HPO_4$ and 553 mls. of 15.2% sodium hypochlorite solution were then continuously mixed in. This brought the final temperature up to 67° C. Mixing was continued while allowing the whole mass to cool to 55° C. At 55° C., 385 gms. of anhydrous $Na_3PO_4$ and 306 mls. of 15.2% sodium hypochlorite solution were added slowly. On completion of this addition the following was added and stirred in quickly: 679 gms. of sodium tripolyphosphate, 453 gms. of anhydrous sodium metasilicate and 11.35 gms. of sodium dodecyl benzene sulphonate. This procedure produced the trisodium phosphate/sodium hypochlorite complex containing 15% w./w. sodium tripolyphosphate, 10% w./w anhydrous sodium metasilicate and 10% w./w. of an anionic surface active agent, i.e. a single complex of several desirable ingredients.

Various changes and modifications of the invention can be made and, to the extent that such variations incorporate the spirit of this invention, they are intended to be included within the scope of the appended claims.

What is claimed is:
1. The method of producing a sodium phosphate/sodium hypochlorite complex having the composition $(Na_3PO_4 11H_2O)_4 NaClO$ which comprises:
preparing an aqueous starting solution containing sodium phosphate and sodium hypochlorite with the ratio $Na_2O:P_2O_5$ being within the area of FIG. 4 of the accompanying drawings bounded by the lines JK, KL, LM and MJ, with the composition of the points being as follows:

| Point | Percent Na₂O | Percent P₂O₅ |
|---|---|---|
| J | 14.8 | 16.8 |
| K | 19.6 | 17.7 |
| L | 17.4 | 13.4 |
| M | 6.6 | 7.6 | and the sodium hypochlorite content is not less than in the said complex, at a temperature about 65° C., cooling the solution to a temperature from about 30° C. to 60° C. to crystallize out the desired $(Na_3PO_4 11H_2O)_4 NaClO$ complex, and also form a residual fluid phase.

2. The method of producing a sodium phosphate/sodium hypochlorite complex having the composition $(Na_2PO_4 11H_2O)_4 NaClO$ which comprises:
preparing an aqueous starting solution containing sodium phosphate and sodium hypochlorite with the ratio $Na_2O:P_2O_5$ being within the area of FIG. 4 of the accompanying drawings bounded by the lines JK, KL, LM and MJ, with the composition of the points being as follows:

| Point | Percent Na₂O | Percent P₂O₅ |
|---|---|---|
| J | 14.8 | 16.8 |
| K | 19.6 | 17.7 |
| L | 17.4 | 13.4 |
| M | 6.6 | 7.6 | and the sodium hypochlorite content is not less than in the said complex, at a temperature above 65° C., cooling the solution to a temperature from about 30° C. to 60° C. to crystallize out the desired $$Na_3PO_4 11H_2O)_4 NaClO$$

complex, and also form a residual fluid phase, and adding an additive composition containing $Na_2O:P_2O_5$ and less water than the starting solution to the residual fluid phase to maintain its $Na_2O:P_2O_5$ composition within the bounded area of FIG. 4, to form a mixture at 30° C. to 60° C., to precipitate additional $(Na_3PO_4 11H_2O)_4 NaClO$.

3. The method of claim 2 in which the $Na_2O:P_2O_5$ ratio of the additive is about the same as the $$(Na_3PO_4 11H_2O)_4 NaClO$$

complex.

4. The method of producing a sodium phosphate/sodium hypochlorite complex having the composition $(Na_3PO_4 11H_2O)_4 NaClO$ which comprises:
preparing an aqueous starting solution containing sodium phosphate and sodium hypochlorite with the ratio $Na_2O:P_2O_5$ being within the area of FIG. 4 of the accompanying drawings bounded by the lines JK, KL, LM and MJ, with the composition of the points being as follows:

| Point | Percent Na₂O | Percent P₂O₅ |
|---|---|---|
| J | 14.8 | 16.8 |
| K | 19.6 | 17.7 |
| L | 17.4 | 13.4 |
| M | 6.6 | 7.6 | and the sodium hypochlorite content is not less than the said complex, at a temperature above 65° C. cooling the solution to a temperature from about 30° C. to 60° C. to crystallize out the desired $$(Na_3PO_4 11H_2O)_4 NaCyO$$

complex, and also form a residual fluid phase, and adding a water abstracting material consisting of an alkali metal phosphate, alkali metal tripolyphosphate, alkali metal pyrophosphate, alkali metal silicate, alkali metal metasilicate, alkali metal disilicate, alkali metal tetrasilicate, alkali metalsesquisilicate, alkali metal carbonate or any mixture of these materials and containing less water than the starting solution, to the residual fluid phase in such amount as to keep the fluid phase within the bounded area of FIG. 4 to precipitate additional $$(Na_3PO_4 11H_2O)_4 NaClO$$

and form a dry, free-flowing stable hypochlorite composition.

5. The method of producing a sodium phosphate/sodium hypochlorite complex having the composition $(Na_3PO_4 11H_2O)_4 NaClO$ which comprises:
preparting an aqueous starting solution containing sodium phosphate and sodium hypochlorite with the ratio $Na_2O:P_2O_5$ being within the area of FIG. 4 of the accompanying drawings bounded by the lines JK, KL, LM and MJ, with the composition of the points being as follows:

| Point | Percent Na₂O | Percent P₂O₅ |
|---|---|---|
| J | 14.8 | 16.8 |
| K | 19.6 | 17.7 |
| L | 17.4 | 13.4 |
| M | 6.6 | 7.6 | and the sodium hypochlorite content is not less than in the said complex, at a temperature above 65° C., cooling the solution to a temperature from about 30° C. to 60° C. to crystallize out the desired $$(Na_3PO_4 11H_2O)_4 NaClO$$

complex, and also form a residual fluid phase, and adding an additive composition containing $Na_2O:P_2O_5$, sodium hypochlorite and less water than the starting solution to the residual phase at 45° C. to 60° C. to maintain its $Na_2O:P_2O_5$ composition within the bounded area of FIG. 4, and cooling the mixture to precipitate additional $$(Na_3PO_4 11H_2O)_4 NaClO$$

complex and obtain a dry free-flowing product.

References Cited

UNITED STATES PATENTS

| | | | |
|---|---|---|---|
| 1,555,474 | 9/1925 | Mathias | 23—50 |
| 1,965,304 | 7/1934 | Adler | 23—86 |
| 2,032,173 | 2/1936 | Johnson et al. | 23—86 X |
| 2,536,456 | 1/1951 | Miller | 23—86 |
| 3,364,147 | 1/1968 | Stamm | 252—99 |

FOREIGN PATENTS

| | | |
|---|---|---|
| 1,004,148 | 3/1957 | Germany. |
| 1,129,136 | 5/1962 | Germany. |

HERBERT T. CARTER, Primary Examiner

U.S. Cl. X.R.

252—99, 187; 424—149

PO-1050
(5/69)

UNITED STATES PATENT OFFICE
CERTIFICATE OF CORRECTION

Patent No. 3,525,583           Dated August 25, 1970

Inventor(s) Ronald Henry Vickers

It is certified that error appears in the above-identified patent and that said Letters Patent are hereby corrected as shown below:

Col. 2, line 6, change "should" to --would--; Col. 3, line 11, change "NaOH)" to --NaOH--; Col. 4, line 72, change "ponit" to --point--; Col. 5, line 51, change "crystalilzation" to --crystallization--; Col. 8, line 15, change ")NaClO" to --NaClO--; Col. 11, line 44, change "1.052" to --1,052--; Col. 11, line 62, change "were." to --were--; Col. 13, line 18, change "about" to --above--; Col. 13, line 25, change "Na$_2$" to --Na$_3$--; Col. 13, line 42, change "Na$_3$" to --(Na$_3$--; Col. 14, line 5, change "NaCyO" to --NaClO--; Col. 14, line 25, change "preparting" to --preparing--

SIGNED AND
SEALED
NOV 3 1970

(SEAL)
Attest:

Edward M. Fletcher, Jr.
Attesting Officer

WILLIAM E. SCHUYLER, JR.
Commissioner of Patents